(12) United States Patent
Estrada

(10) Patent No.: US 7,561,903 B2
(45) Date of Patent: Jul. 14, 2009

(54) WIRELESS HEADPHONES WITH DUAL ANTENNAS

(75) Inventor: Andrew Xavier Estrada, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 573 days.

(21) Appl. No.: 11/359,129

(22) Filed: Feb. 21, 2006

(65) Prior Publication Data

US 2007/0173300 A1 Jul. 26, 2007

Related U.S. Application Data

(60) Provisional application No. 60/761,730, filed on Jan. 23, 2006.

(51) Int. Cl.
*H04M 1/00* (2006.01)
(52) U.S. Cl. ............... 455/575.2; 455/569.1; 455/552.1
(58) Field of Classification Search .............. 455/569.1, 455/575.2, 552.1
See application file for complete search history.

(56) References Cited

U.S. PATENT DOCUMENTS

| 6,208,740 | B1 | 3/2001 | Grever .................. 381/79 |
| 6,301,367 | B1 | 10/2001 | Boyden et al. ............. 381/376 |
| 6,456,645 | B1 | 9/2002 | Kurrat .................. 375/140 |
| 6,539,204 | B1 | 3/2003 | Marsh et al. ............... 455/63.1 |
| 6,553,078 | B1 * | 4/2003 | .ANG.kerberg ............. 375/267 |
| 6,678,892 | B1 | 1/2004 | Lavelle et al. .................. 725/75 |
| 6,745,018 | B1 | 6/2004 | Zehavi et al. ............... 455/296 |
| 6,980,165 | B2 * | 12/2005 | Yuasa et al. ................. 343/718 |
| 2003/0072131 | A1 * | 4/2003 | Hood et al. ................. 361/683 |
| 2004/0242242 | A1 | 12/2004 | Wu et al. .................. 455/456.5 |
| 2007/0115801 | A1 * | 5/2007 | Li et al. ...................... 370/208 |
| 2007/0136446 | A1 * | 6/2007 | Rezvani et al. ............. 709/219 |
| 2007/0280386 | A1 * | 12/2007 | Waes et al. .................. 375/347 |

* cited by examiner

*Primary Examiner*—Barry W Taylor
(74) *Attorney, Agent, or Firm*—John L. Rogitz

(57) ABSTRACT

A wireless headphone assembly has left and right speakers attached to ends of a headphone body, and at least two antennas, e.g., one located at each speaker. Since multiple antennas are used, reception can be improved using one of several approaches, e.g., simple selection of the "best" antenna, multiplexing antenna input, using diversity algorithms such as multiple input multiple output (MIMO) algorithms, etc.

3 Claims, 1 Drawing Sheet

Configure antennas such that low likelihood exists of nulling occuring simultaneously — 36

Select, combine, or multiplex antennas to optimize — 38

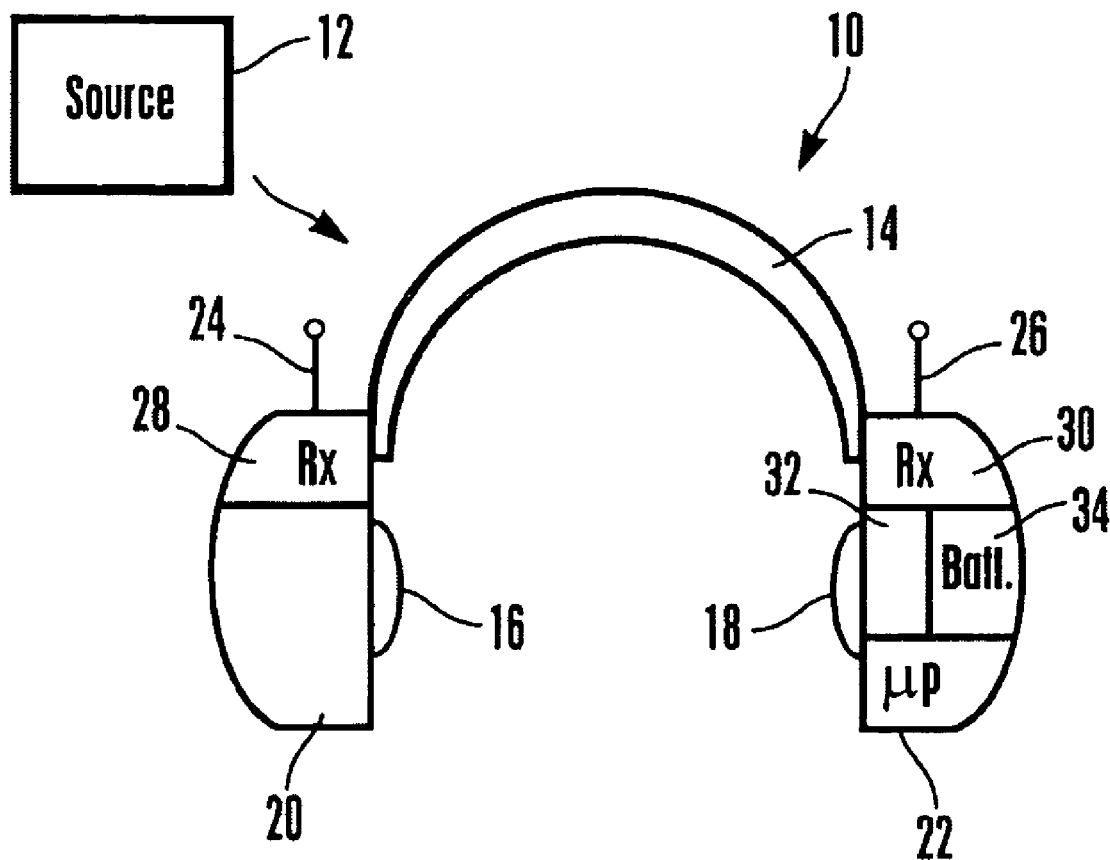
Figure 1
Figure 2
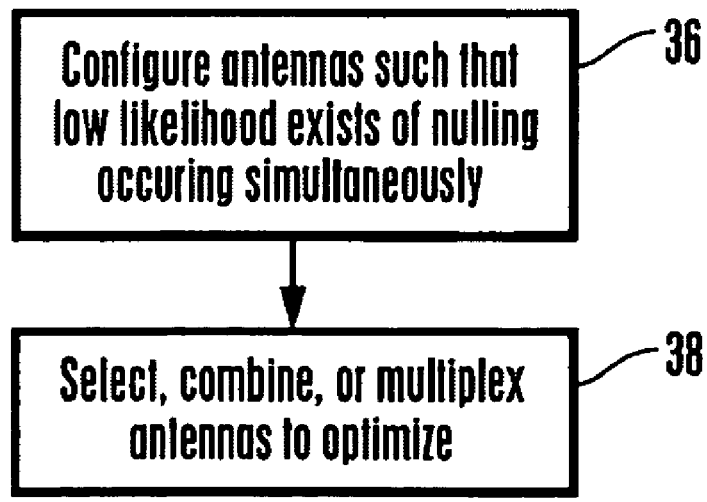

WIRELESS HEADPHONES WITH DUAL ANTENNAS

This application claims priority to U.S. provisional patent application serial no. 60/761,730, filed Jan. 23, 2006.

FIELD OF THE INVENTION

The present invention relates generally to wireless headphones.

BACKGROUND OF THE INVENTION

Wireless headphones have been provided for a number of applications, including listening to television audio, portable music players, and computer game audio. As understood herein, a drawback of wireless headphones is that they sometimes "drop out" (effectively stop playing audio on the headphone speakers) because of a variety of reasons, including antenna nulling, body shadowing, multipath fading, etc. The present invention further understands that it would be desirable to address this problem without increasing transmission power, which can be wasteful of power, or increasing audio buffering or receiver sensitivity, which can lead to cost increases. Accordingly, with these observations in mind, the present invention is provided.

SUMMARY OF THE INVENTION

A wireless headphone includes a body configured to fit onto a user's head and defining opposed ends. A first speaker is coupled to the body and is juxtaposed with the first end, while a second speaker is coupled to the body and is juxtaposed with the second end. A wireless receiver is supported by the body and is electrically connected to at least one of two or more antennas that are coupled to the body.

In some implementations the first antenna can be juxtaposed with the first speaker and the second antenna can be juxtaposed with the second speaker. A processor can be supported on the body for executing an antenna selection protocol. Without limitation, the protocol can be the selection of one and only one antenna based on quality metrics derived from signals from both antennas, or an antenna diversity protocol such as a MIMO protocol, or a multiplexing protocol. In non-limiting embodiments the first antenna has a first nulling direction and the second antenna has a second nulling direction different from the first.

In another aspect, a wireless headphone includes a body and defining opposed ends. A first speaker is coupled to the body and is juxtaposed with the first end, while a second speaker is coupled to the body and is juxtaposed with the second end. Two or more antennas are coupled to the body. Means are provided for selectively combining signals from the antennas into an audio stream playable by the speakers.

In yet another aspect, a method includes receiving, at a headphone assembly that can be worn on the head of a person, first wireless signals from a first antenna. The method also includes receiving at the headphone assembly second wireless signals from a second antenna, and employing an antenna selection procedure at the assembly.

BRIEF DESCRIPTION OF THE DRAWINGS

The details of the present invention, both as to its structure and operation, can best be understood in reference to the accompanying drawings, in which like reference numerals refer to like parts, and in which:

FIG. 1 is a schematic diagram of the present wireless headphones; and

FIG. 2 illustrates the logic of the present invention.

DETAILED DESCRIPTION OF THE PREFERRED EMBODIMENT

Referring initially to FIG. 1, a headphone assembly 10 is shown, generally designated 10, which receives wireless audio signals from a source 12 such as but not limited to a portable music player, game device, etc. As shown, the headphone assembly 10 includes an elongated body 14 that is configured to fit on the head of a person. Accordingly, in non-limiting embodiments the body 14 may be slightly elastic and curved as shown.

In accordance with headphone principles known in the art, the body 14 has opposed ends, and juxtaposed with the ends of the body 14 are respective speakers 16, 18. In the embodiment shown, the speakers 16, 18 are borne on padded speaker mounts 20, 22 that are configured for comfortably fitting against a user's ear.

In any case, the headphone assembly 10 includes at least first and second antennas 24, 26. In the non-limiting embodiment shown, the first antenna 24 can be juxtaposed with the first speaker 16 and the second antenna 26 can be juxtaposed with the second speaker 18, although if desired both antennas can be mounted on the same speaker or elsewhere on the body. The antennas 24, 26 may be mounted on the body 14 or on the speaker mounts 20, 22 to receive signals from the source 12. Preferably, to reduce the likelihood that a signal from the source 12 will be in null zones of both antennas simultaneously, the first antenna 24 has a first nulling direction and the second antenna 26 has a second nulling direction different from, e.g., orthogonal to, the first.

Each antenna 24, 26 may be associated with a respective wireless receiver 28, 30 as shown, with each receiver 28, 30 being supported on the body 14 or on respective speaker mounts 20, 22 as shown. In other implementations only a single receiver need be used. In the latter case, the processor discussed below, prior to executing antenna selection as discussed further in relation to FIG. 2, executes a pre-selection multiplexing step in which the first antenna 24 is connected to the receiver, the output of the receiver is evaluated, then the second antenna 26 is connected to the receiver and the output of the receiver is re-evaluated.

The receiver or receivers 28, 30 are electrically connected to a processor 32 so that signals from the receivers 28, 30 are processed by the processor 32 in accordance with disclosure below. The processor 32 may be mounted anywhere on the headphone assembly 10, such as on one of the speaker mounts 20, 22 as shown. More than one processor can be provided to execute the logic below. One or more dc batteries 34 are also supported on the assembly 10, e.g., on one of the speaker mounts or on the body 14, to power the receivers and processor.

Now referring to FIG. 2, as shown at block 36 the antennas 24, 26 preferably are configured and mounted on the assembly 10 in a way such that a low likelihood exists of nulling of source 12 signals occurring at both antennas 24, 26 simultaneously. Then, block 38 shows that the processor 32 executes logic to optimize antenna use.

In one non-limiting embodiment, the logic executed by the processor 32 at block 38 includes the selection of one and only one antenna based on quality metrics derived from signals from both antennas. By way of non-limiting example, the processor 32 may select signals from the antenna currently having the lowest bit error rate (BER), or the antenna providing the highest signal-to-noise ratio (SNR). Yet again, the antenna providing the highest received power may be selected. In any case, signals from the selected antenna are provided to both speakers 16, 18. When the quality metric of the non-selected antenna improves over that of the selected antenna, the processor switches the selected antenna.

In another non-limiting embodiment, the logic executed by the processor 32 at block 38 includes employing an antenna diversity protocol to combine the input from both antennas and provide the combined signal to the speakers 16, 18. For example, the processor 32 may execute a multiple input multiple output (MIMO) protocol. Non-limiting discussions of MIMO protocols are set forth in the following Sony U.S. patent publications, incorporated herein by reference: 2005/0276245 (frequency diversity MIMO); 2005/0249304 (spatial diversity MIMO); 2005/0249151 (singular value decomposition MIMO). Yet again, the protocol can be a simple multiplexing protocol wherein signals from the first antenna are selected for a first relatively short (e.g., a few milliseconds) period for playing on the speakers, then signals from the second antenna are selected, and back and forth so that signals from a "good" antenna are always ensured to be played in a period that is imperceptibly short to a user.

While the particular WIRELESS HEADPHONES WITH DUAL ANTENNAS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method, comprising:
    mounting a first antenna to a first speaker mount on a headphone assembly wearable on the head of a person;
    mounting a second antenna to a second speaker mount on the headphone assembly;
    receiving, at the a headphone assembly wearable on the head of a person, first wireless signals from the a first antenna;
    receiving, at the headphone assembly, second wireless signals from the a second antenna; and
    at the headphone assembly, employing at least one antenna selection procedure including a multiplexing protocol which includes transmitting signals to the speakers that alternate between signals from the first antenna and signals from the second antenna in rapid succession such that the differences between the two signals are imperceptible to a user.

2. The method of claim 1, wherein the first antenna has a first nulling direction and the second antenna has a second nulling direction different from the first.

3. The method of claim 1 further comprising configuring the first and second antennas in a way that reduces the likelihood that nulling of source signals will occur at both antennas simultaneously.

* * * * *